Patented May 11, 1943

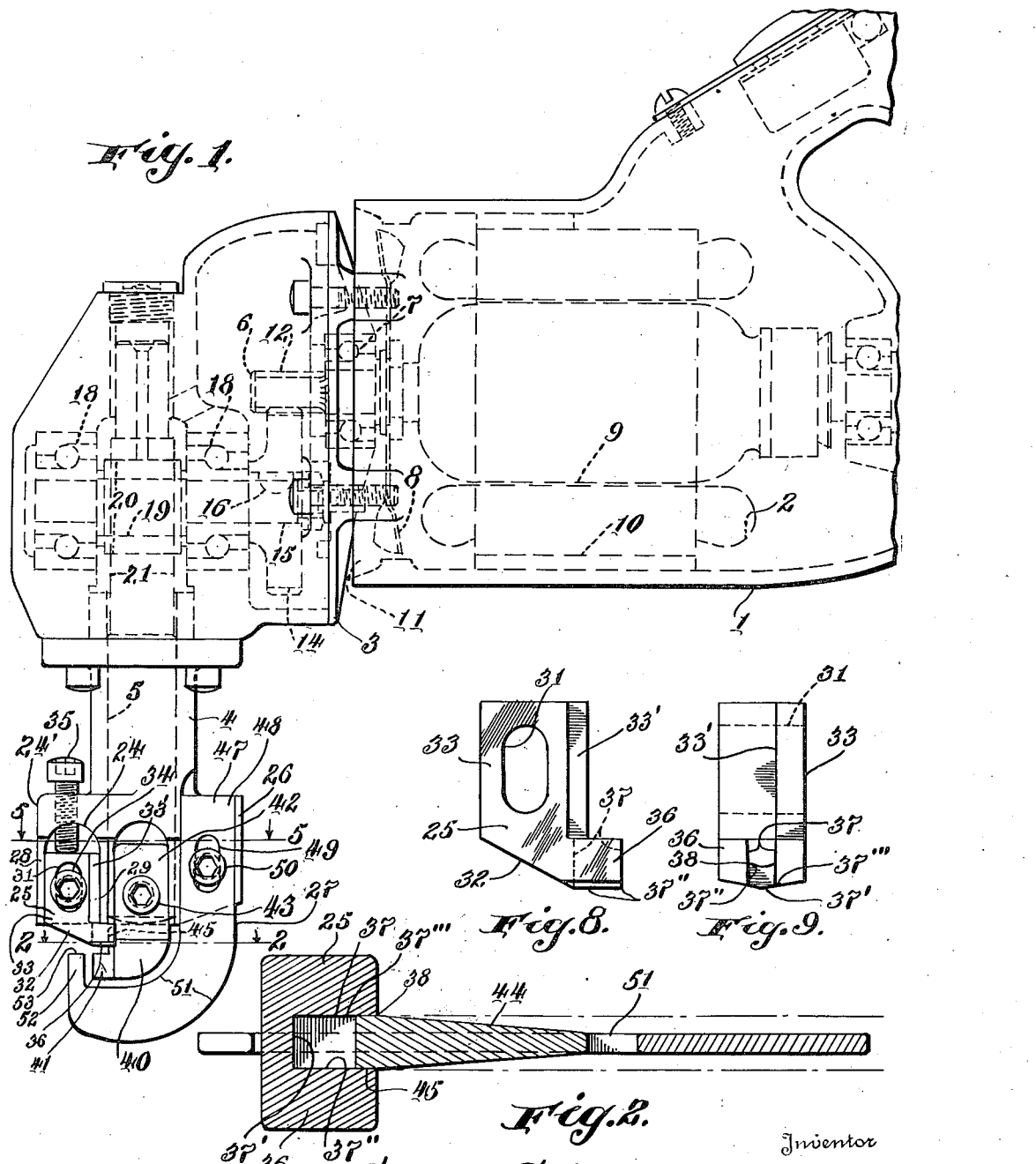

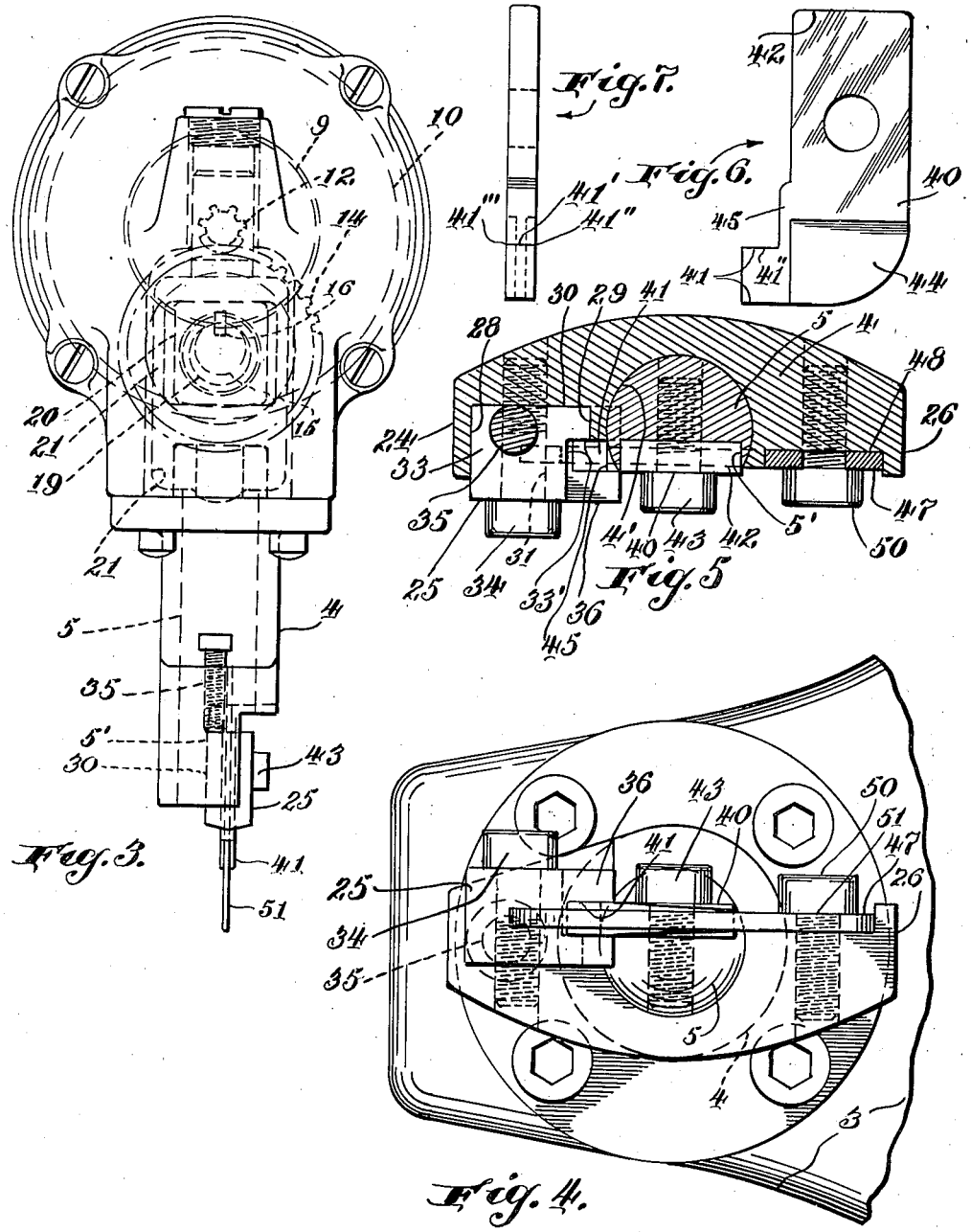

2,318,982

UNITED STATES PATENT OFFICE 2,318,982

PORTABLE SHEET METAL CUTTING TOOL

Glenn C. Wilhide, Towson, Md., assignor to The Black and Decker Manufacturing Company, a corporation of Maryland Application July 30, 1940, Serial No. 348,344

13 Claims. (Cl. 30—228)

The invention relates to a portable electric tool for cutting sheet metal and particularly for making cuts of indefinite and unlimited length through the center or any part of a piece of a sheet of metal or other stiff material of unlimited size.

While the portable electric shears of the various makes now on the market are satisfactory for the majority of sheet metal cutting work, there are certain conditions as in the cutting of corrugated iron and other instances where the cut is started from a hole in a sheet or in cutting tubing to which such shears are not well suited. The present tool is adapted to meet this and similar conditions to which the shears above referred to are not well adapted. The tool of the invention also has the advantage that it is capable of adjustment to the thickness of material and is adapted to be made in various sizes with motors of corresponding power for operation at various speeds on sheet metal of various hardness and particularly of a variety of thicknesses.

The invention relates particularly to a portable sheet metal cutting tool having a nibbling action, this type of tool being regarded as particularly well adapted to the cutting operations above described and also to other sheet metal cutting operations to which the portable electric shears now in use are less suited. The present type of tool differs from the tools of the shearing class in that instead of making a single shearing cut by which the metal is severed along a line of no perceptible width as in the cutting of a piece of paper with a pair of scissors, the tool of the application actually cuts or punches out, at each stroke, a small piece of metal of the thickness of the sheet being cut, and of the width of the cutters and the tool is, by forward pressure applied by the operator, moved forward after each stroke to the extent of the corresponding dimension of the piece removed by the preceding stroke.

To this end, the tool of the invention has as its cutting elements, instead of the well known shear blades above suggested by reference to commercial electric shears, a die member or female cutter with a suitable die cavity and a moving cutter referred to as a male cutter adapted to enter said cavity in die cutting relation. In the cutting operation the cutters are normally beneath the casing and the die engages the sheet from above, the die cavity being downwardly disposed to receive the moving or male cutter which engages the die cavity from beneath, i. e., on the upstroke, with a continuous reciprocating motion. The die and the cooperating cutter may, for convenience, be referred to as the female and male cutters respectively.

The male cutter, in the preferred form of the invention, is carried by a reciprocating plunger or cutter carrier which is guided in a stationary normally upright guide from the lower end of which the male cutter protrudes, the die or female cutter member being mounted on the lower end of the plunger guide or tubular housing with the die opening downwardly disposed.

It is regarded as an important feature of the invention that the reciprocating or male cutter block or member is preferably of L-shaped configuration, the cutting edges being on the horizontal arm of the L and thus offset from the shank and upwardly disposed. The female cutter block is similarly but oppositely offset, the die being above the offset of the male cutter so that the cutting operation is performed as the offset portion of the male cutter moves upwardly into the die cavity. The sheets being cut enter between the offset of the male cutter and the die opening by advancement of the tool after each complete reciprocation or cutting stroke. The escape of the chips or cuts may be provided for by rabbeting or grooving the cutting block shank in a vertical direction above the die opening and leading upwardly therefrom. This groove is open at one end providing for the free discharge of chips.

In the preferred form of the invention, the tubular housing also carries, opposite to or beneath the die, a support for the material which in cooperation with the cutting block or die guides the metal sheet being cut into the bite of the cutters and may also act as a guard for the male or reciprocating cutter.

The small cross sectional area of the male cutter below the die and the fact that the guard is removable make it feasible to start cutting from a small hole, and to cut tubing and corrugated material to the best advantage. In numerous instances cutting may be started from a bored hole to cut tubing, corrugated metal and the like, without removing the guard.

It is of interest that both the die and guide may be adjusted along the cutter carrier housing or tube in the direction of the stroke to adapt the tool to the cutting of material of different thicknesses and the male cutter and the die opening are capable of considerable variation as to the width of cut.

The width of the cut and, hence, the width of the die opening and male cutters are capable of considerable variation as is also the length of the cut and hence the possible forward motion of the tool for each stroke. For extra strength the male cutter and the die opening have been made as wide as one quarter of an inch and to meet other conditions they have been made as narrow as three thirty-seconds of an inch. Both these dimensions and the length of the cut, i. e., the extent to which the tool may be advanced at each stroke which latter may be around one thirty-second of an inch are determined to meet the conditions presented, as are other details, a reasonable variation of the same being contemplated.

In the accompanying drawings I have illustrated a portable or hand supported electric tool of the nibbler type embodying the features of my invention in the preferred form.

In the drawings:

Fig. 1 is a side elevation of the tool broken away at the rear or right hand side of the figure, particularly as to the handle or grip, for convenience of illustration.

Fig. 2 is an enlarged section on the line 2—2 in Fig. 1, looking downwardly.

Fig. 3 is an elevation looking from the left in Fig. 1.

Fig. 4 is a bottom plan view of the cutters and housing and guard or guide.

Fig. 5 is a section on line 5—5 in Fig. 1.

Figs. 6 and 7 are detail views of the male cutter, and

Figs. 8 and 9 are detail views of the die member.

Referring to the drawings by numerals each of which is used to indicate the same or similar parts in the different figures, the construction shown which may be regarded as illustrative of the preferred form of the invention comprises a field casing 1, enclosing an electric motor 2, a gear casing 3, suitably attached to and registering with the forward end of the field casing, and a tubular housing 4, enclosing a plunger or moving cutter carrier 5, which reciprocates therein being guided thereby as hereinafter described.

The motor 2 is provided with an armature shaft 6 which rotates in bearings 7 in the casing and is also provided with a fan 8 or any suitable cooling device. The fan 8 as shown is adapted to cool by drawing air through and between the armature 9 and field 10 and around the latter, the air being either taken in or ejected through the opening 11 and the field casing 1 having corresponding openings near its opposite end.

The motor shaft 6 is provided with pinion teeth 12 which, in the form of the invention shown, mesh with a suitable drive gear 14 mounted on and keyed to the drive shaft 15 in any suitable manner as by means of a key 16.

The drive shaft 15 is mounted in suitable bearings 18 in the gear casing 3, and has formed thereon or otherwise operatively connected thereto an eccentric 19 which rotates in and operates a suitably apertured bearing block 20 which slides laterally in a rectangular loop or ring 21 formed in the upper end of the plunger or moving cutter carrier 5 this cutter carrier being guided for straight line motion in the tubular housing 4 receives a straight line reciprocating motion in the direction of its length from said block 20 and eccentric 19.

The tubular housing 4 is provided on its front side which is at the left in Fig. 1 with a bracket 24 for the die or female cutter member or block 25 and on its opposite side with a bracket 26 for the moving cutter guard and work guide 27. The bracket 24 comprises vertical ways 28 and 29 parallel to the path of carrier 5 and an intermediate seat or support 30 see Fig. 5 and the female cutter member block 25 has a shank 33 adapted to enter between said ways and to rest on said seat or support 30, being secured by bolt 34 extending through slot 31 in the shank 33.

When the bolt 34 is loosened the die member is adjustable upwardly and downwardly in the direction of the path of carrier 5, its position being determined by the vertical bolt 35 threaded through the head 24' of bracket 24 parallel to the path of plunger 5. The female cutter block 25 has at its lower end an offset die block 36.

The position of the bottom surface of the die block 36 relatively to the top surface of the male cutter 41 in its bottom position determines the thickness of the metal which may be fed to the cutters, and cut.

In the form shown, the die member 25 or female cutter block as seen in side elevation Fig. 8 has an offset rearwardly and horizontally projecting die block 36 and a downwardly and rearwardly inclined work guiding surface 32 leading to the bottom surface of the die block 36 and hence to the bite of the cutters from the front of the die member or female cutter block 25.

The die cavity 37, see particularly Fig. 9 extends upwardly through die block 36 and, is preferably of rectangular cross section being provided on the lower edges of its forward and lateral sides with downwardly disposed cutting edges 37', 37'', and 37''', the rear of said die cavity at 38 Fig. 2 being open to admit the cutter portion 41 of the male or reciprocating cutting block 40 and its guide 45 to be described. The female cutting block or die member 25 as shown has its shank 33 rabbetted vertically at 33' upwardly from the die cavity 37 or otherwise open above the die cavity to release the chips.

The male cutter block 40, in the form of the invention shown, has an offset forwardly and horizontally projecting male cutting portion or cutter 41 adapted to enter the die cavity 37 and has upwardly disposed cutting edges 41', 41'', and 41''', which co-operate with the cutting edges 37', 37'', and 37''' of the die. The male member 40 is also provided with a flat or suitably formed shank 42 secured to the lower end of the plunger 5 in any suitable manner as by means of a bolt 43. The plunger 5 is preferably recessed or rabbetted at 5' to bring the shank 42 within the cross sectional area of the opening in the guide 4 and to thus permit the shank 42 to enter the inside 4' of the tubular housing 4. In the form of the invention shown the lower end of this shank at 44 has a reducing taper rearwardly from the cutter 41 as indicated at 44 in Fig. 2. This reduces the volume of metal in the cutter and also facilitates long radius turning of the tool in the cut formed by the male cutter and die, as indicated in broken lines Fig. 2.

The male cutting member 40, as illustrated in Fig. 6, has a forwardly projecting vertically elongated guiding portion 45 extending upwardly from the cutting edges 41'', 41'''. This guiding portion fits in the die cavity 37 particularly in the opening or slot 38, and on account of its vertical extent this guiding portion engages the slot or opening 38 throughout the cutting stroke.

In the form of the invention shown, there is also a cutter guard and work guide member 27 Fig. 1 supported on the bracket 26 which is formed on the rear of the lower end of the plunger guide or housing 4 as previously described. This member 27 preferably has a shank 47 which fits and slides adjustably in a suitable seat 48 in said bracket 26 and is slotted at 49 being secured in adjusted position by means of a bolt 50 in said slot, all said details being subject to variation.

This cutter guard and work guide, as shown, extends downwardly and forwardly beneath the cutter member 40 in the form of a hook 51 and has an upwardly extending portion 52 just forwardly of the male disk block 41, and the female cutter 36 or die. Said portion 52 of the hook terminates at its upper end in a flat surface 53 adjacent or slightly above the lowermost position of the top surface of the male cutter at 41 and beneath the forwardly and upwardly inclined but downwardly disposed surface 32 of the die or female cutter member. Thus the surface 53 is in position to guide and support and does guide and support the sheet being cut during the cutting operation, and, in particular, immediately after the cut and prior to the feed. Also the hook portion 51 of this guide protects the reciprocating cutter from undesired contact with foreign bodies serving also as an efficient protection against injury to the workman.

The operation of the sheet metal cutting tool of the invention has been fully described in connection with the description of its construction including the features, arrangement and details.

The tool of the invention has numerous advantages, some of which are as follows; the die member or female cutter can be instantaneously adjusted vertically or in the direction of the stroke to adapt the tool to various thicknesses of material to be cut; the male or reciprocating cutter is carried on a reciprocating plunger 5, which is provided with a tubular guide or housing which also serves as a support for the die or female cutter, and likewise supports the cutter guard and work support or guide. This cutter guard serves with the maximum of efficiency as a protection for the workman, extending completely around and beneath the reciprocating or male cutter, being supported at the rear of the same, and it also provides a work guide in front of the cutter. It is also of interest that this cutter guard and/or work guide is of considerably less width than the cutters see Fig. 2 so that it passes easily through the cut in the sheet material permitting a lateral motion or rotation of the tool whereby long radius curves may be cut and the cut may be straightened or deflected at the will of the operator.

It is further of interest that the cut being formed on the upstroke, the tool is advanced at the end of the return or down stroke the material being thus passed between the female cutter or die and the male reciprocating cutter, when they are spaced apart for the cutting operation, and held against vibration due to the cutter motion, the cutting element of the male cutter passing repeatedly into the die cavity and cutting successive chips from the sheet as the latter is advanced, or according to the more usual operation, as the tool is advanced into the work.

It is also of interest that both the male and female cutters are conveniently detachable and that different widths of male cutters with corresponding die cavities may be employed. By changing the cutters, not only the width of the cut but the extent of the feed at each stroke can be changed, both the width of the male cutter, the size and width of the die cavity and the offset of the male cutter being subject to variation for this purpose.

While the tool is particularly suited to the cutting of corrugated iron, it is also available for cutting any type of sheet metal and in cutting metal sheets it is entirely convenient and possible on account of the small cross-sectional area of the male cutter and guard and the arrangement of the die block above the moving or male cutter to enter the male cutter in a hole in the center or any part of a sheet of metal or the like to cut the sheet in any way, and, it is also of interest that the cutter may be entered in a hole in tubing or otherwise used for cutting off tubing to the desired length, being much more satisfactory for these purposes and capable of entering a smaller hole than any of the various well known types of portable shears. It is also of interest that the cutter guard may be removed to permit starting the cut in more confined spaces and in smaller holes than can be entered when the guard is in place and when thus operated sharper curves may be cut, the rearward taper of the male cutter contributing to this end.

While the illustration and description relate to the specific details of the tool in the preferred form, the various features of the tool as disclosed and the arrangement thereof are subject to variation.

I have thus described a portable tool embodying the features of the invention in the preferred form; the description being specific in order that the manner of constructing, operating and using the invention may be fully understood; however, the specific terms herein are used descriptively rather than in a limiting sense, the scope of the invention being defined in the claims.

What I claim as new and desire to secure by Letters Patent is:

1. In a hand supported sheet metal cutting tool having an electric motor and casing, a guide at right angles to the motor axis and depending from the casing and a plunger reciprocating in said guide and operated from said motor; a male cutter block removably mounted on said plunger and having a horizontally offset male cutter, a female cutter block removably mounted on the lower end of said guide and having a female cutter offset above, and having a downwardly disposed die cavity in die cutting alignment with said male cutter, said female cutter block having a downwardly disposed guide surface forward of said cavity and downwardly and rearwardly inclined to the cutting edges of said female cutter.

2. In a hand operated sheet metal cutting tool having an electric motor and casing and a tubular housing and guide at right angles to the motor axis and depending from the casing, a plunger reciprocating in said guide and reducing gears in said casing whereby said plunger is operated from said motor, a male cutter member mounted on said plunger and having an offset male cutting member, a female cutter mounted on the lower end of said housing and comprising a cutter block with a downwardly disposed nibbler die cavity above and in die cutting alignment with said male cutter which enters said cavity and cuts on the upstroke, a cutter guard mounted on said tubular housing and at the side of said male cutter which is opposite to said female cutter member and having a hook portion surrounding the male cutter at the rear, as determined by the progress of the cut, and beneath and in front, said front portion having a top surface adjacent the horizontal plane of the top of said male cutter in its low position and serving as a work guide.

3. A portable sheet metal cutting tool having a motor and a motor casing, a moving cutter carrier with a normally vertical depending guide therefor, said guide being supported on said casnig and means for reciprocating said carrier from said motor; a male cutting member on said carrier and a female cutter block, the male cutter member having an offset cutter and the female cutter block being mounted on said guide and having a downwardly disposed die cavity in the path of the male cutter, the die cavity being U-shaped and open at the rear providing a slot in alignment with said reciprocating motion, the male cutter member having a guide extending upwardly from said cutter and projecting forwardly into and fitting said slot and engaging the same throughout the stroke.

4. A portable sheet metal cutting tool having a motor and a motor casing, a plunger with an upright guide therefor normally depending from said casing, means for reciprocating said plunger from said motor and male and female cutter members; the male cutter member having an offset cutter and being mounted on said plunger and the female cutter having a downwardly disposed die cavity in the path of the male cutter which cuts on the upstroke, the female cutter member being mounted on the plunger guide, the tool also comprising means for securing the female cutter member to said guide in various positions of adjustment arranged in the direction of said reciprocating motion.

5. A portable sheet metal cutting tool having a motor and a motor casing, a plunger with a straight line guide therefor, the guide being mounted on and projecting from said casing, means for reciprocating said plunger from said motor, a male cutter member mounted on said plunger and a female cutter member mounted on said guide; both said members having offset cutters, the female cutter having a die cavity in registration with the male cutter and open at one side providing a slot in alignment with said reciprocating motion, the male cutter having a guide fitting said slot, means for adjusting the female cutter along the plunger guide in the direction of said reciprocating motion, a guard for the moving cutter surrounding the cutter in the plane of the plunger path and of the direction of the cut, said guard extending about three sides of the moving cutter, and being spaced beyond the female cutter by the thickness of the sheets to be cut and in the direction of said path to support the work and provide for the entrance of the sheet being cut.

6. A portable sheet metal cutting tool having a motor and a motor casing, a plunger with a straight line guide therefor, the guide being mounted on and projecting downwardly from said casing, means for reciprocating said plunger from said motor, a male cutter member mounted on said plunger and a female cutter member mounted on said guide; said members being spaced in the direction of the progress of the cut and having respectively forwardly and rearwardly offset cutters, the female cutter having a die cavity in registration overlapping with the male cutter and open rearwardly toward the male cutter member providing a slot in alignment with said reciprocating motion, the male cutter having a guide fitting said slot, and the female cutter member having a passage for the discharge of chips, the same being elongated in the direction of the cutting stroke which is toward the casing and said guide being in engagement with said slot throughout the stroke.

7. A hand supported sheet metal cutting tool having a motor and a male nibbler cutter member reciprocated by said motor and a stationary nibbler die member mounted on said motor; the male cutter member having an offset cutter which enters the die from the side of the latter remote from said motor, the die having a downwardly and rearwardly inclined guiding surface and a work guide spaced downwardly therefrom.

8. In a hand supported sheet metal cutting tool of the nibbler type having an electric motor and casing, a tubular guide depending at right angles to the motor axis and a plunger reciprocating in said guide and operated from said motor; a male cutter block mounted on said plunger and having a male cutter offset forwardly in the direction of advancement of cut, a female cutter block mounted on the lower end of said guide forwardly of said male cutter block and having a female cutter offset rearwardly from said block above said male cutter and having a downwardly disposed die cavity in die cutting alignment with said male cutter, said die cavity having a U-shaped cross section in the plane of the work and being open at the rear providing a slot extending in the direction of the stroke of the male cutter, said male cutter block having a guide projecting upwardly from the male cutter in the direction of the stroke and entering and fitting the mouth of said cavity providing interengaging guiding means on the male and female cutter blocks which are in engagement throughout the stroke.

9. In a hand supported sheet metal cutting tool of the nibbler type having an electric motor and casing, a guide depending from the casing, a plunger reciprocating in said guide and a reduction gear in said casing whereby said plunger is operated from said motor; a cutter member mounted on said plunger and having a cutter offset forwardly in the direction of progress of the cut, a second cutter member mounted on the lower end of said plunger guide and located forwardly in said direction from the first cutter member and having a cutter offset rearwardly from said second cutter member and overlapping said first cutter and above the latter, said cutters having, male and female die cutting edges in alignment in the direction of reciprocation, and cooperating guiding means on said respective cutters whereby one said offset cutter has a guiding engagement with the other cutter member throughout the cutting stroke.

10. In a hand supported sheet metal cutting tool of the nibbler type having an electric motor and casing, a guide depending from the casing in a direction transverse to the motor axis, a plunger reciprocating in said guide, said plunger being operated by said motor, a cutter block removably mounted on said plunger and having a horizontally offset cutter projecting forwardly in the direction of progress of the cut, a second cutter block removably mounted on the lower end of said cutter guide and located forwardly in said direction from the first cutter block and having a cutter above and overlapping said first cutter, said cutters having male and female die cutting edges in die cutting alignment in the direction of the stroke, means for securing said second cutter block in a series of positions of adjustment in the direction of the stroke and means for determining the adjusted position of the same.

11. A hand-supported sheet metal cutting tool having a motor with a casing, a depending guide, a plunger reciprocating along said guide and operatively connected to the motor and a female cutter block having an offset die mounted on the guide; a male cutting block mounted on the plunger and having an offset cutter aligned with and below the die into and out of which it is moved by the plunger motion, the female cutter block having guides in which it is adjustable in the direction of the plunger motion, and having a rabbet extending upwardly from the die adjacent one guide providing a discharge path for the chips produced in cutting.

12. In a hand-supported sheet metal cutting tool having a motor with a casing, a plunger reciprocated from and by the motor, a guide for the plunger mounted on the casing, male and female cutter blocks mounted on the plunger and guide, respectively, and having an offset male cutter and die, respectively, the die cavity being of U-shaped cross section in a plane transverse to the direction of reciprocation and the male cutter having a guide disposed in the direction of reciprocation and engaging the open end of the U.

13. A hand-supported sheet metal cutting tool as in claim 12 in which the female cutter block has a rabbet leading from the die cavity in the direction of reciprocation whereby the chips are discharged.

GLENN C. WILHIDE.